(12) United States Patent
Weinstock et al.

(10) Patent No.: US 6,400,863 B1
(45) Date of Patent: Jun. 4, 2002

(54) MONITORING SYSTEM FOR A HYBRID FIBER CABLE NETWORK

(75) Inventors: Jonathan A. Weinstock, Doylestown; William H. Blum, Harleysville; Nicholas D. Lee, King of Prussia, all of PA (US); Clive E. Holborow, San Diego, CA (US); Richard R. Dziekan, North Wales, PA (US)

(73) Assignee: General Instrument, Horsham, PA (US)

( * ) Notice: Subject to any disclaimer, the term of this patent is extended or adjusted under 35 U.S.C. 154(b) by 23 days.

(21) Appl. No.: 09/588,387

(22) Filed: Jun. 6, 2000

Related U.S. Application Data

(60) Provisional application No. 60/138,932, filed on Jun. 11, 1999.

(51) Int. Cl.[7] ............................. G02B 6/28; G02F 1/00
(52) U.S. Cl. ............................. 385/24; 385/15; 385/39; 385/100; 359/109; 359/113
(58) Field of Search ............................. 385/15, 16, 17, 385/24, 39, 42, 14, 100, 101; 359/109, 113, 115, 118, 125, 143, 173

(56) References Cited

U.S. PATENT DOCUMENTS

| 5,113,459 A | * | 5/1992 | Grasso et al. ................. 385/24 |
| 5,434,937 A | * | 7/1995 | Glance ........................ 385/24 |
| 5,581,566 A | * | 12/1996 | St. John et al. ............. 371/37.6 |
| 5,757,526 A | * | 5/1998 | Shiragaki et al. ............ 359/110 |
| 5,778,117 A | * | 7/1998 | Inoue et al. .................. 385/24 |
| 5,793,770 A | * | 8/1998 | St. John et al. ............. 370/401 |
| 6,122,044 A | * | 9/2000 | Gautheron et al. ....... 385/24 X |
| 6,285,673 B1 | * | 9/2001 | Blackburn et al. .......... 370/360 |

\* cited by examiner

*Primary Examiner*—Brian Healy

(57) ABSTRACT

A monitoring system for a HFC network includes a plurality of "test points" disposed at various locations throughout the network. Each test point is used to allow for the isolation of communication problems within the network (for example, ingress) and mitigation of the effects of the network problems. By distributing a plurality of test points throughout the topology of the network, only limited sections of the network need to be isolated at any point in time to address the particular communication problem.

16 Claims, 3 Drawing Sheets

MONITORING SYSTEM FOR A HYBRID FIBER CABLE NETWORK

CROSS-REFERENCE TO RELATED APPLICATION

This application claims priority of Provisional Application No. 60/138,932, filed Jun. 11, 1999.

TECHNICAL FIELD

The present invention relates to a monitoring system for a hybrid fiber cable (HFC) communication network and, more particularly, to the use of a plurality of "test points", distributed through the network topology to locate and isolate sources of noise (such as ingress) within the network.

BACKGROUND OF THE INVENTION

Modem cable systems utilize a hybrid fiber cable (HFC) architecture in which signals are distributed via a fiber optic connection to a node which converts the optical signal to an electrical signal and distributes the signals to residences via a tree and branch coaxial cable distribution network ("plant") consisting of the coaxial cable, amplifiers and taps. The plant can be made bi-directional through use of a fiber optic return signal from the node to the head end. A return band, typically from 5–42MHz, is used to support transmission from devices in the home back to the head end. Transmissions from the residences are received at the node, converted to an optical signal, and transmitted to the headend on a separate return fiber or on a return wavelength separate from the downstream wavelength.

An ideal bi-directional cable network can be defined in terms of several characteristics including, but not limited to, the ability to suppress undesirable energy in the network, the ability to identify undesirable energy sources, the ability to thwart or otherwise reduce the likelihood of pirates in the network, high shared bandwidth efficiency, quality of service reliability, flexible bandwidth allocation and network sharing.

Suppressing undesirable energy in an HFC network is an important characteristic when operating a network having a bi-directional communication path on a shared wire between a headend and each of a plurality of remote points. One technical challenge is to maintain adequate network integrity for signals being transmitted simultaneously in the forward path and return path directions so that signals are not contaminated and do not require retransmission. "Ingress" is defined as unwanted energy that enters a communication path from a source external to the communication path. Ingress presents one of the greatest problems in a network since the unwanted signal is often an impulse noise that enters the network at a weak point, where these weak points are all too often at or near a remote point where there is a shield discontinuity, a poor shield, or a faulty connector. Radio frequency carriers from shortwave radio, citizen's band radio, or other broadcast sources may also enter the network at these weak points and cause interference peaks at specific carrier frequencies in the communication path. Another ingress source is impulse noise consisting of high power, short duration energy pulses. The high power energy pulse results in a significant rise in the noise floor while the short duration results in an elusive disruption whose source or entry point is difficult to pinpoint.

Thus, a need remains in the art for an arrangement capable of recognizing and isolating sources of noise (e.g., ingress) in an HFC network without impacting the performance of the entire network.

SUMMARY OF THE INVENTION

The need remaining in the prior art is addressed by the present invention, which relates to a monitoring system for a hybrid fiber cable (HFC) communication network and, more particularly, to the use of a plurality of "test points", distributed through the network topology, to locate and isolate sources of noise (such as ingress) within the network.

In an exemplary embodiment of the present invention, a set of test points are disposed at the "top" of each branch, between a series of endpoints and the cable mode test system (CMTS). One function performed by the CMTS is to monitor the return signals (upstream) and compare the bit error rate (BER) of each return signal against a predetermined threshold. When the threshold is exceeded, an alarm signal (including the identity of the nearest test point) is sent to a network management system. The network management system then communicates with the test point nearest the noise source to either "isolate" that part of the network or actively alter the performance of the network to mitigate the noise problem.

In one embodiment, a set of active notch filters may be used as the test points, with the capability to move the center frequency of a filter to block a particular source of ingress noise from progressing upward through the network. In an alternative embodiment, a scanning receiver (or set of receivers) may be used to monitor a set of channels reserved for upstream transmission and thus block any particular channel experiencing ingress noise.

Other and further embodiments of the present invention will become apparent during the course of the following discussion and by reference to the accompanying drawings.

BRIEF DESCRIPTION OF THE DRAWINGS

Referring now to the drawings.

DESCRIPTION OF THE INVENTION

The present invention is useful in addressing the concerns mentioned above relating to the ability to pinpoint the source(s) of, for example, ingress in an HFC communication system. In particular, the present invention is directed to the utilization of a distributed set of test points to monitor both downstream and upstream communications, and provide information regarding the location of the communication problem within the network topology.

Figure 1:
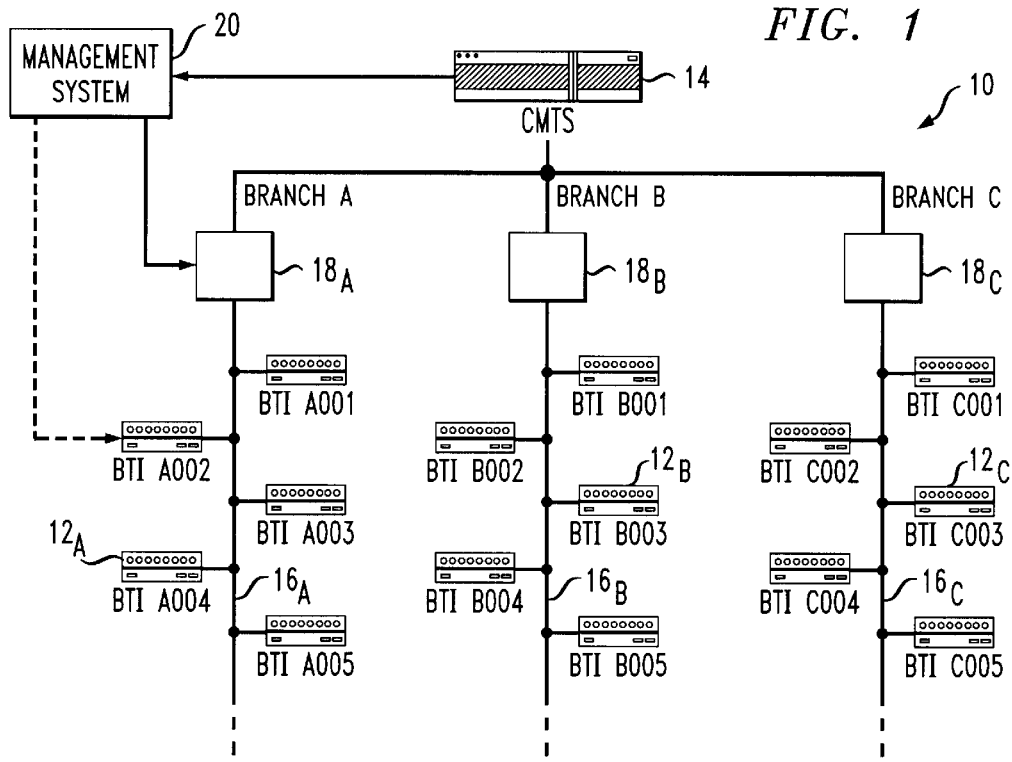
FIG. 1 illustrates a portion of an exemplary hybrid fiber coax (HFC) network including a set of test points for isolating sources of noise in accordance with the present invention.

FIG. 1 illustrates a portion of an exemplary HFC network 10. Network 10 serves a plurality of endpoints 12, where each endpoint 12 may comprise a separate home or office, connected to network 10 via a cable modem. The network portion illustrated in FIG. 1 includes three branches, labeled "A", "B", and "C", all feeding into a cable modem test system (CMTS) 14. Branch A includes a first group of endpoints $12_A$ tapping off of a first cable communication path $16_A$, branch B includes a second group of endpoints $12_B$ similarly connected along a second cable communication path $16_B$, and branch C is formed of a third group of endpoints $12_C$ tapping off of a third cable communication path $16_C$. In accordance with the present invention, a separate HFC test point 18 is disposed in each path between endpoints 12 and CMTS 14. Particularly, a first HFC test point $18_A$ is located at the "top" of branch A between endpoints $12_A$ and CMTS 14, a second HFC test point $18_B$ is located at the "top" of branch B between endpoints $12_B$ and CMTS 14 and, similarly, a third HFC test point $18_C$ is located at the "top" of branch C between endpoints $12_C$ and CMTS 14. It is to be noted that this topology is exemplary only, and various other arrangements of test points may be deployed. For example, each branch may include two or more test points, so as to be able to further isolate the location of ingress without having to affect communication along the other portions of the branch. Referring back to FIG. 1, a network management system 20 is includes and receives as inputs "alarm" signals from CMTS 14 regarding error conditions within the network. Network management system 20 then provides as outputs, to the test points, specific control signals to mitigate the error condition. The control signals may include, for example, attenuating a particular signal level to reduce a noise signal, switching to a different frequency within an assigned channel, or alternatively, completely turning off a certain problematic channel.

In most circumstances, CMTS 14 is used to monitor, for example, the digital detection of ingress. That is, CMTS 14 includes a predetermined bit error rate (BER) threshold that is considered acceptable for receiving valid communication along the upstream communication signal paths. When the predetermined BER threshold is exceeded along one of the branches associated with CMTS 14 (meaning that ingress exists along that branch), an alarm message is created and sent to monitoring system 20. In response, monitoring system 20 communicates with the particular test point 18 associated with the affected branch to isolate the source of ingress and mitigate its effect on the rest of the network. As will be discussed below, there exist many alternative structures that may be used within test point 18, but in general each embodiment is used to isolate (and at times mitigate) the source of ingress.

Figure 2:
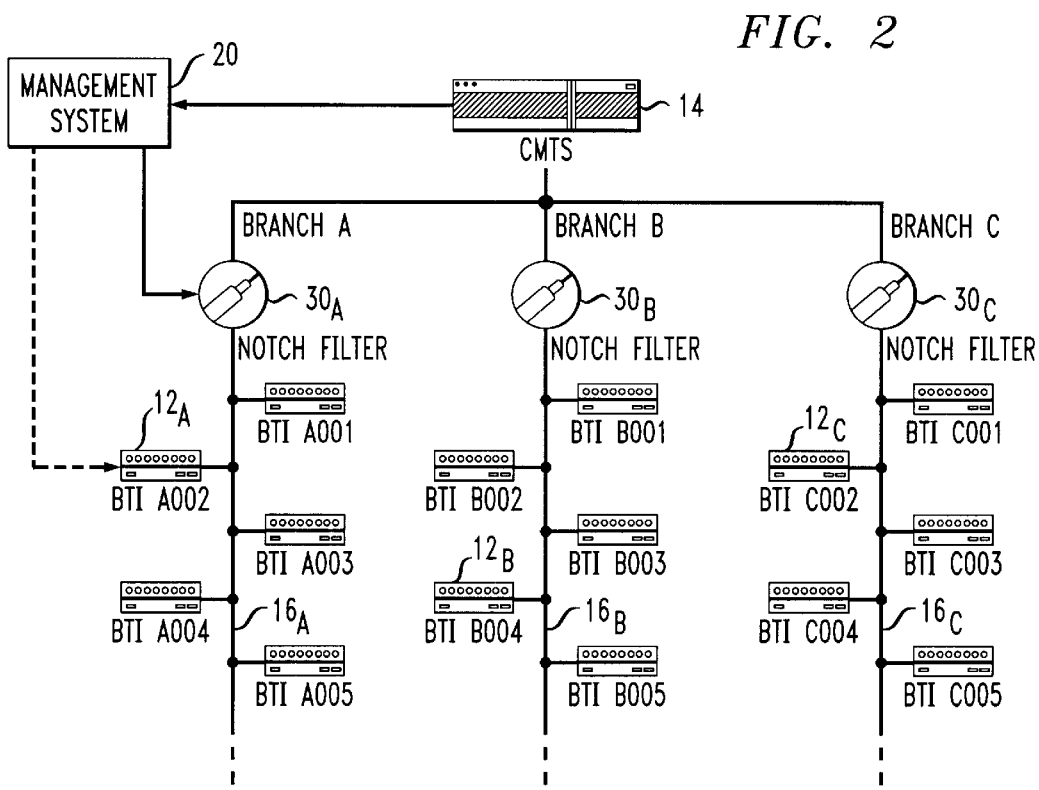
FIG. 2 is a particular embodiment of the arrangement of FIG. 1 utilizing active notch filters as the test points.

FIG. 2 illustrates an exemplary arrangement of network 10 utilizing a plurality of active notch filters 30 as test points within the network. As with the basic arrangement illustrated in FIG. 1, each cable branch A–C in communication with CMTS 14 includes a separate active notch filter $30_A$–$30_C$. In operation, CMTS 14 tracks BER as mentioned above. The errors are categorized by branch and frequency within CMTS 14. When the associated BER is exceeded, an alarm message is sent to management system 20. In turn, management system 20 sends a control signal to the proper active notch filter 30, instructing the notch filter to be centered at the frequency experiencing the error and either attenuate or "shut off" any signals being sent upstream at this frequency. The source of ingress, therefore, is isolated by using the active notch filter test point of the present invention. CMTS 14, in conjunction with management system 20, may also instruct endpoints 12 along the affected branch to move the upstream transmission from the "noisy" channel to a "cleaner" channel (as indicated by the dotted line between management system 20 and exemplary endpoint 12A).

Figure 3:
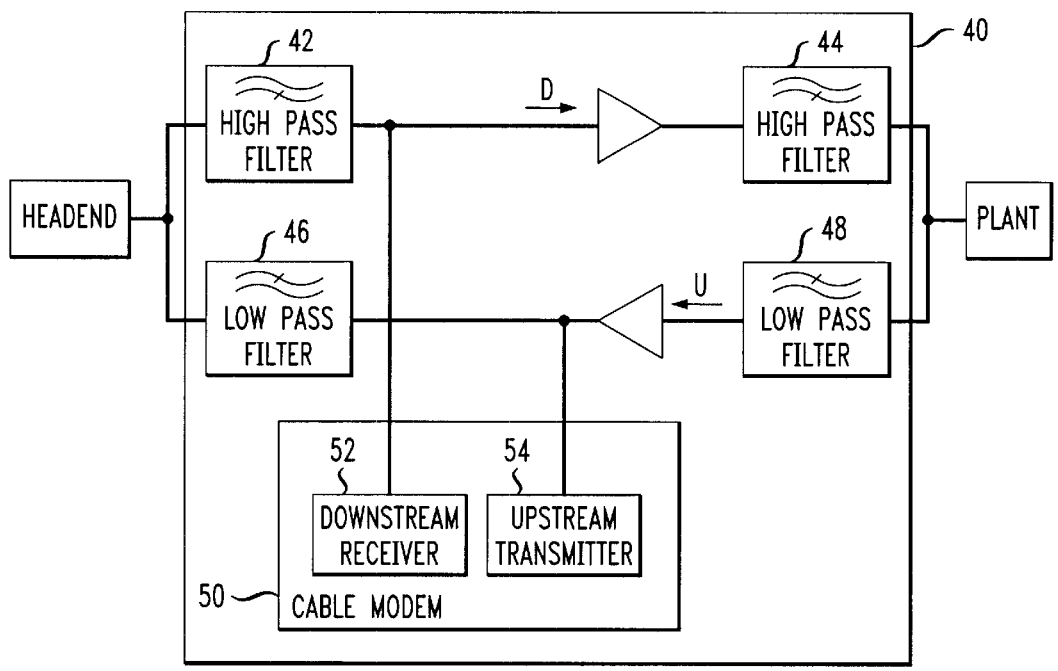
FIG. 3 is an alternative embodiment of one branch of the network of FIG. 1, utilizing, essentially, a broadband/telephony interface (BTI) unit as a network test point.

FIG. 3 illustrates an alternative test point arrangement 40, where one such test point arrangement 40 would be disposed at the top of each branch within the network just as each branch illustrated in FIG. 2 includes a separate notch filter 30). In general, test point 40 comprises (essentially) a conventional broadband/telephone interface (BTI) unit, with the "downstream" communication direction between CMTS 14 and a set of endpoints 12 (collectively referred to as "plant" in FIG. 3) in indicated by an arrow with the letter "D"; the upstream is similarly marked with an arrow and the letter "U". A pair of high pass filters 42,44 are located at the input and output of downstream path D and a pair of low pass filters 46,48 are located at the input and output of upstream path U. A monitoring unit 50 included within arrangement 40 comprises a downstream receiver 52 coupled to downstream path D between filters 42,44 and an upstream transmitter 54 coupled to upstream path U between filters 46,48. As with the arrangement discussed above in association with FIG. 2, CMTS 14 continues to monitor each branch A–C to perform digital detection of ingress and, when detected, send an "alarm" signal to management system 20. In response to the receipt of an alarm, management system 20 transmits a control signal the cable modem endpoints, instructing the endpoints to move from the "noisy" channel to a "cleaner" channel. Once the move is completed, the "noisy" channel will be vacant (in terms of signal transmission). Isolation of the source of ingress is accomplished by test points 40 of the present invention by each test point analyzing the proper channel. The particular test point 40 which receives the noise signal within its upstream transmitter 54 is then associated with the source of ingress, providing isolation of the ingress source and allowing for subsequent repair of the network at that point.

Figure 4:
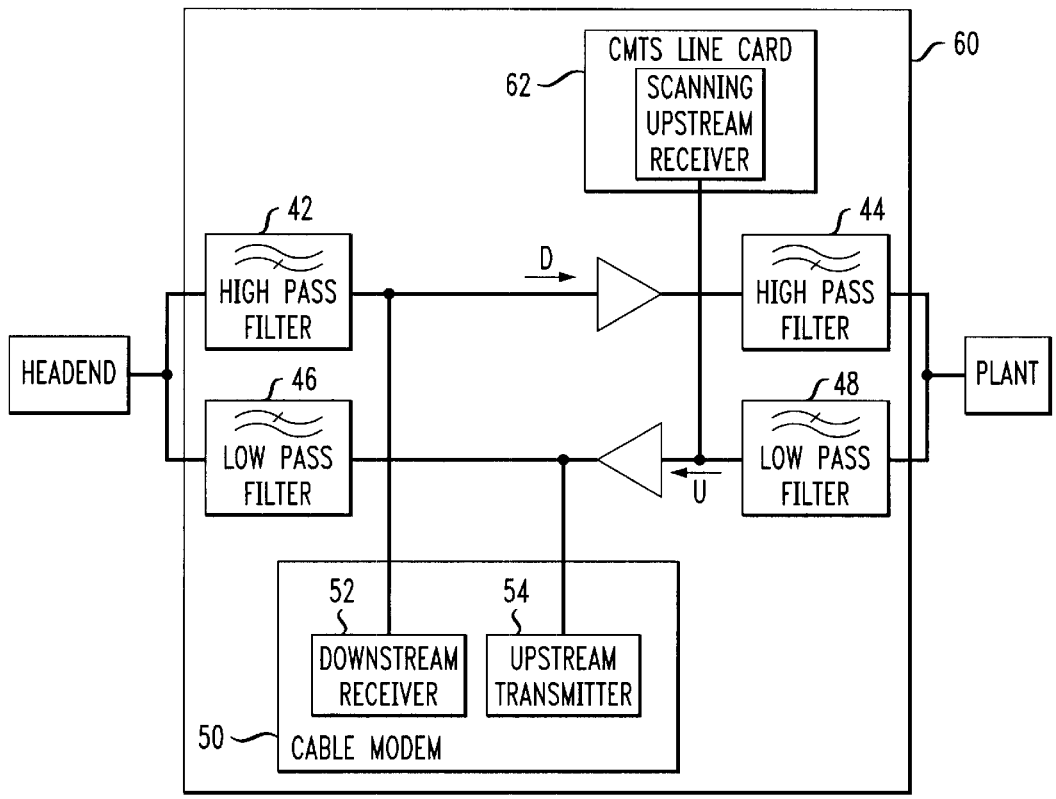
FIG. 4 illustrates an associated alternative to FIG. 3, including a scanning arrangement for monitoring a plurality of upstream channels.

The arrangement of FIG. 3 utilizes the monitoring of one specific upstream channel associated with transmission from the endpoints 12 upward into HFC network. FIG. 4 illustrates as an alternative a scanning test point arrangement 60, where scanning test point 60 includes a scanning upstream receiver 62, used in conjunction with the arrangement described above in association with FIG. 3. In operation, scanning receiver 62 functions to scan all possible upstream channels (for example, 8 channels, in general, N channels are possible). Each upstream channel is dwelled on for a predetermined period of time and the scanning functions to monitor the "health" of all possible channels, not just the single channel currently being used.

Figure 5:
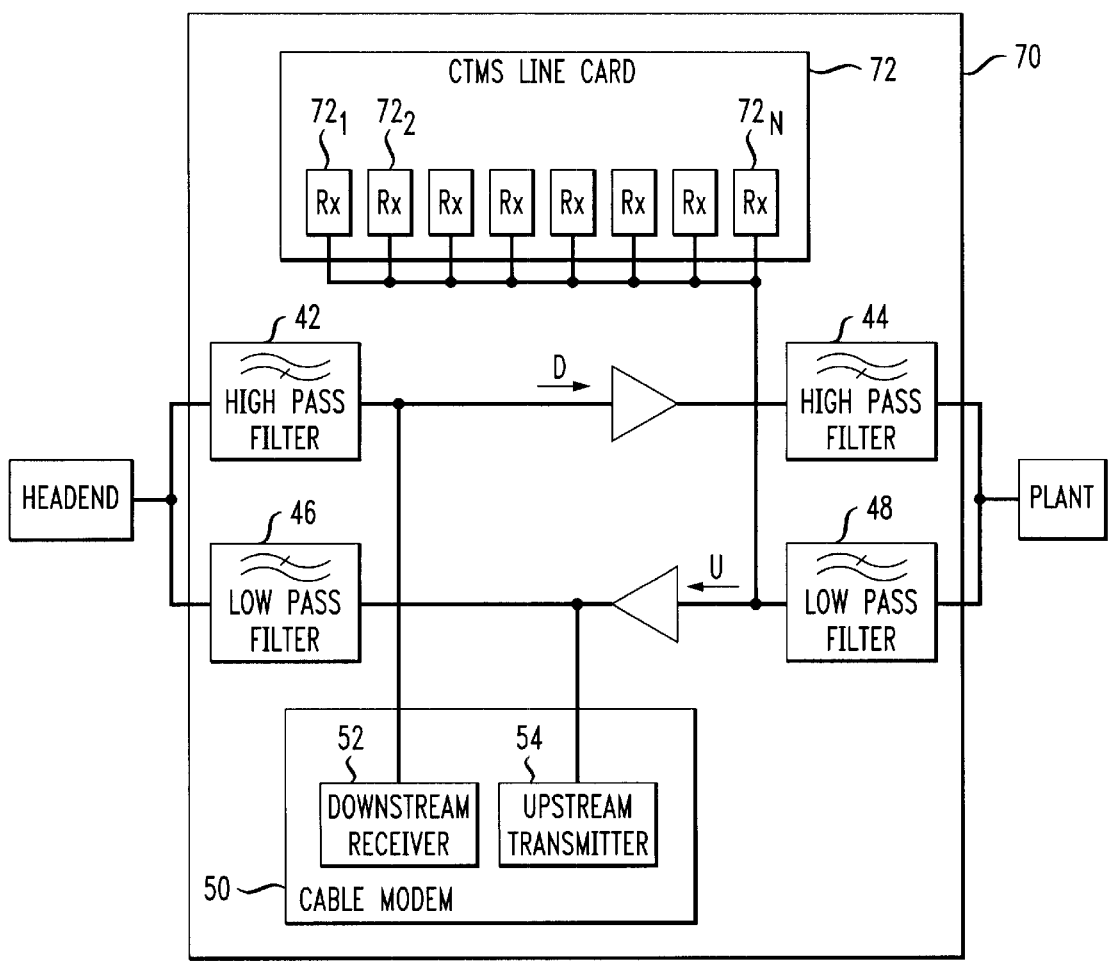
FIG. 5 is an alternative to the arrangement of FIG. 4, utilizing a discrete set of receivers for monitoring upstream channels, a separate receiver associated with each upstream channel.

As an alternative to scanning all N upstream channels, a separate upstream receiver can be used to continuously monitor each upstream channel. FIG. 5 illustrates one exemplary embodiment 70 of this arrangement, using a plurality of separate receivers $72_1, 72_2, \ldots 72_N$. In this arrangement, detection of ingress noise on any channel may be found more quickly than in an arrangement which requires scanning each channel in turn.

There exist monitoring systems in the prior art that operating by analyzing the upstream signal as it enters the network at the endpoint. Such a system is thus incapable of recognizing and troubleshooting ingress problems that are introduced into the network along the signal paths between the endpoints and the headend. In contrast, the utilization of a distributed set of test points in accordance with the present invention allows for various sources of ingress to be detected, isolated, and repaired without affecting the performance of the remainder of the network. In general, the monitoring arrangement of the present invention is capable of being implemented with any desired network topology. For example, two or more test points may be included along each signal branch, with monitor 20 thus able to pinpoint the source of ingress with greater accuracy. Thus, the scope of the present invention is considered to be limited only by the claims appended hereto.

What is claimed is:

1. A broadband hybrid fiber cable communication network for providing bi-directional communication between a headend and a plurality of endpoints, the network comprising a plurality of cable branches coupled to the cable modem test system for distributing downstream communication along a plurality of cable communication paths to a group of endpoints located at drops along each cable communication path, each cable branch also for consolidating upstream communication from its associated group of endpoints;

a network monitoring system for monitoring communication signals propagating both downstream from the headend to the endpoints and upstream from the endpoints to the headend, the monitoring system utilizing a predetermined bit error rate threshold associated with both upstream and downstream communication and functioning to measure the real time bit error rates associated with both upstream and downstream communication within the network, said monitoring system further providing a control output signal when the predetermined error rate threshold is exceeded; and a plurality of test points disposed within the network between the headend and each cable branch, each test point in communication with the monitoring system for receiving as an input said monitoring system control output signal and using said control output signal to isolate a particular location associated with excessive bit error rate.

2. A broadband hybrid fiber cable communication network as defined in claim 1 wherein the network monitoring system comprises a cable modem test system coupled to an upstream termination of each cable branch, said cable modem test system including predetermined bit error rate threshold limits and responsive to information transmission upstream along each branch for comparing a real time bit error rate with the predetermined bit error rate threshold and generating an alarm signal when a bit error rate threshold has been exceeded at an identified location within the network; and a network monitoring system, responsive to the alarm output from the cable modem test set, for determining the identity of the test point associated with the received alarm and transmitting an alarm response signal to said identified test point.

3. A broadband hybrid fiber cable communication network as defined in claim 1 wherein a separate test point is disposed at the upstream termination of each cable branch.

4. A broadband hybrid fiber cable communication network as defined in claim 1 wherein a plurality of test points are disposed along each cable branch, a separate test point associated with separate groups of endpoints.

5. A broadband hybrid fiber cable communication network as defined in claim 1 wherein each test point comprises an active notch filter.

6. A broadband hybrid fiber cable communication network as defined in claim 1 wherein each test point comprises a broadband/telephone interface (BTI unit including a downstream receiver and an upstream transmitter for monitoring the communication on the downstream path and upstream path, respectively.

7. A broadband hybrid fiber cable communication network as defined in claim 1 wherein each test point comprises a scanning receiver for monitoring a plurality of separate channels capable of being used for upstream transmission.

8. A broadband hybrid fiber cable communication network as defined in claim 1 wherein each test point comprises a plurality of separate receivers, each for monitoring a separate one of a plurality of channels capable of being used for upstream transmission.

9. A monitoring arrangement for use in a hybrid fiber coax communication network comprising a plurality of separate cable branches, each cable branch comprising a plurality of endpoints and the plurality of branches terminating at a common headend, the arrangement comprising a monitoring system for monitoring communication signals propagating both downstream from the headend to the endpoints and upstream from the endpoints to the headend, utilizing a predetermined bit error rate threshold associated with both upstream and downstream communication and functioning to measure the real time bit error rates associated with both upstream and downstream communication within the network, said monitoring system further providing a control output signal when the predetermined error rate threshold is exceeded; and a plurality of test points disposed within the network between the headend and each cable branch, each test point in communication with the monitoring system for receiving as an input said monitoring system control output signal and using said control output signal to isolate a particular location associated with excessive bit error rate.

10. A monitoring arrangement as defined in claim 9 wherein the network monitoring system comprises a cable modem test system coupled to an upstream termination of each cable branch, said cable modem test system including predetermined bit error rate threshold limits and responsive to information transmission upstream along each branch for comparing a real time bit error rate with the predetermined bit error rate threshold and generating an alarm signal when a bit error rate threshold has been exceeded at an identified location within the network; and a network monitoring system, responsive to the alarm output from the cable modem test set, for determining the identity of the test point associated with the received alarm and transmitting an alarm response signal to said identified test point.

11. A monitoring arrangement as defined in claim 9 wherein a separate test point is disposed at the upstream termination of each cable branch.

12. A monitoring arrangement as defined in claim 9 wherein a plurality of test points are disposed along each cable branch, a separate test point associated with separate groups of endpoints.

13. A monitoring arrangement as defined in claim 9 wherein each test point comprises an active notch filter.

14. A monitoring arrangement as defined in claim 9 wherein each test point comprises a broadband/telephone interface (BTI) unit including a downstream receiver and an upstream transmitter for monitoring the communication on the downstream path and upstream path, respectively.

15. A monitoring arrangement as defined in claim 9 wherein each test point comprises a scanning receiver for monitoring a plurality of separate channels capable of being used for upstream transmission.

16. A monitoring arrangement as defined in claim 9 wherein each test point comprises a plurality of separate receivers, each for monitoring a separate one of a plurality of channels capable of being used for upstream transmission.

* * * * *